United States Patent
Wortman et al.

(10) Patent No.: US 11,441,959 B2
(45) Date of Patent: Sep. 13, 2022

(54) PRESSURE INDICATOR THAT RETAINS A HIGH PRESSURE INDICATION

(71) Applicant: Hexagon Technology AS, Alesund (NO)

(72) Inventors: Seth Andrew Wortman, Lincoln, NE (US); Brad James Moutray, Garden City, KS (US)

(73) Assignee: Hexagon Technology AS, Alesund (NO)

( * ) Notice: Subject to any disclaimer, the term of this patent is extended or adjusted under 35 U.S.C. 154(b) by 1035 days.

(21) Appl. No.: 16/131,414

(22) Filed: Sep. 14, 2018

(65) Prior Publication Data

US 2019/0107455 A1  Apr. 11, 2019

Related U.S. Application Data

(60) Provisional application No. 62/568,501, filed on Oct. 5, 2017.

(51) Int. Cl.
| | | |
|---|---|---|
| *G01L 7/16* | (2006.01) | |
| *G01L 19/12* | (2006.01) | |
| *G01L 19/10* | (2006.01) | |

(52) U.S. Cl.
CPC .............. *G01L 7/166* (2013.01); *G01L 7/163* (2013.01); *G01L 19/10* (2013.01); *G01L 19/12* (2013.01)

(58) Field of Classification Search
CPC ... G01L 3/24; G01L 3/242; G01L 5/08; G01L 5/10; G01L 5/101; G01L 5/108;
(Continued)

(56) References Cited

U.S. PATENT DOCUMENTS

| 1,538,423 A | 5/1925 | Cole |
| 1,591,137 A | 7/1926 | Lundy |

(Continued)

FOREIGN PATENT DOCUMENTS

| CN | 2531960 Y | 1/2003 |
| CN | 2854546 Y | 1/2007 |

(Continued)

OTHER PUBLICATIONS

International Search Report and Written Opinion in corresponding international application PCT/US2018/051885, dated Mar. 11, 2019 (22 pages).

(Continued)

*Primary Examiner* — Andre J Allen
(74) *Attorney, Agent, or Firm* — Mai-Tram D. Lauer; Westman, Champlin & Koehler, P.A.

(57) ABSTRACT

A pressure indicator includes a body, a piston, first and second biasing elements, and a rotatable disc. The piston is disposed at least partially in a bore of the body at a first longitudinal axial position relative to the body when pressure of fluid acting on the base is below a threshold pressure. The first biasing element is disposed between a base of the piston and a shoulder of the body, wherein a force of the first biasing element is overcome by pressure of fluid acting on the base at or above the threshold pressure, thereby allowing the piston to move to a second longitudinal axial position. The rotatable disc has a first rotational position when the piston is in the first axial position. The second biasing element is configured to urge the disc to a second rotational position when the piston is in the second axial position.

20 Claims, 6 Drawing Sheets

(58) Field of Classification Search
CPC ......... G01L 5/16; G01L 5/1627; G01L 5/167;
G01L 5/22; G01L 5/28; G01L 23/085;
G01L 23/20; G01L 5/0061; G01L 5/0071;
G01L 5/008; G01L 5/06; G01L 5/171;
G01L 7/106
USPC .................................................... 73/700–756
See application file for complete search history.

(56) References Cited

U.S. PATENT DOCUMENTS

| | | | |
|---|---|---|---|
| 1,807,752 | A | 6/1931 | Poster |
| 3,068,831 | A | 12/1962 | Witchell |
| 3,181,496 | A | 5/1965 | Bilbrey |
| 3,247,824 | A | 4/1966 | Rodgers |
| 3,691,981 | A | 9/1972 | Rao |
| 3,738,311 | A | 6/1973 | Appleton |
| 3,812,816 | A | 5/1974 | Juhasz |
| 4,116,157 | A | 9/1978 | Evans |
| 4,164,196 | A | 8/1979 | Stradella et al. |
| 4,194,529 | A | 3/1980 | Hargraves et al. |
| 4,494,565 | A | 1/1985 | Sinclair et al. |
| 4,499,846 | A | 2/1985 | Bergeron et al. |
| 5,074,339 | A | 12/1991 | Vöhringer |
| 5,339,764 | A | 8/1994 | Singbartl |
| 6,531,960 | B1 | 3/2003 | Gladstone et al. |
| 7,043,992 | B2 | 5/2006 | Bernhard |
| 8,882,721 | B2 | 11/2014 | Jones et al. |
| 9,417,148 | B2 | 8/2016 | Eyring et al. |
| 2008/0282963 | A1* | 11/2008 | Cotter ..................... G01L 19/12 116/266 |
| 2012/0010575 | A1 | 1/2012 | Jones et al. |
| 2019/0136978 | A1* | 5/2019 | Moutray ................. F17C 13/06 |

FOREIGN PATENT DOCUMENTS

| | | |
|---|---|---|
| CN | 102099073 A | 6/2011 |
| CN | 203083764 U | 7/2013 |
| EP | 0264001 A1 | 4/1988 |
| JP | S45-32984 Y1 | 10/1970 |
| JP | S51-3016 Y1 | 1/1976 |
| RU | 164351 U1 | 8/2016 |
| SU | 1013780 A1 | 4/1983 |
| SU | 1675707 A2 | 9/1991 |
| TW | 308641 B | 6/1997 |
| WO | 2005/016664 A2 | 2/2005 |
| WO | WO2005016664 A2 | 2/2005 |
| WO | 2015/013299 A2 | 1/2015 |
| WO | 2017/106221 A1 | 6/2017 |

OTHER PUBLICATIONS

Notification regarding unity of the invention, including search report, for Russian Patent Application No. 2020114759/28, dated Dec. 21, 2020, 21 pages.
Second Office Action for Chinese Patent Application No. 201880062462.2, dated Dec. 13, 2021, 9 pages.
Invitation to Pay Additional Fees in corresponding international application No. PCT/US2018/051885, dated Jan. 14, 2019.
First Examination Report for Indian Patent Application No. 202047017837, dated Sep. 1, 2021, 8 pages.
First Office Action, including search report, for Chinese Patent Application No. 201880062462.2, dated May 8, 2021, 12 pages.
Decision to Grant for Russian Patent Application No. 2020114759, dated Apr. 30, 2021, 17 pages.
Notice of Reason(s) for Rejection for Japanese Patent Application No. 2020-519442, dated Dec. 21, 2021, 7 pages.
Hearing Notice for Indian Patent Application No. 202047017837, dated Dec. 22, 2021, 2 pages.
Office Action for Korean Patent Application No. 10-2020-7011879, dated May 23, 2022, 8 pages.

* cited by examiner

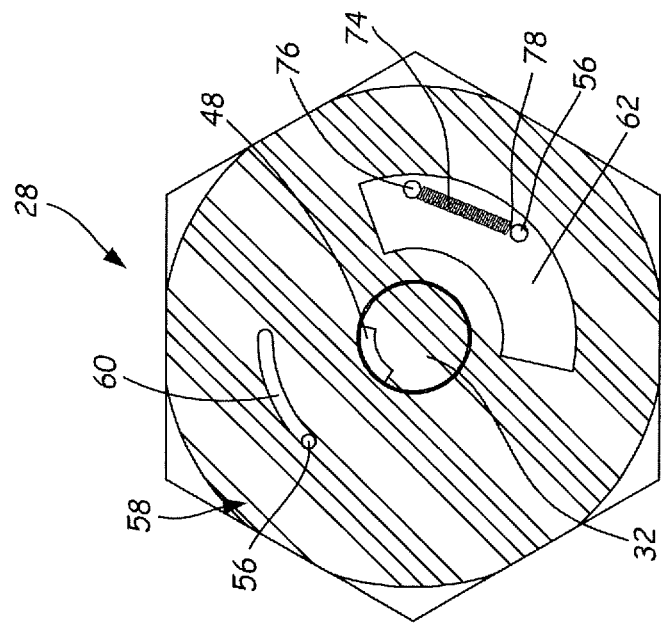
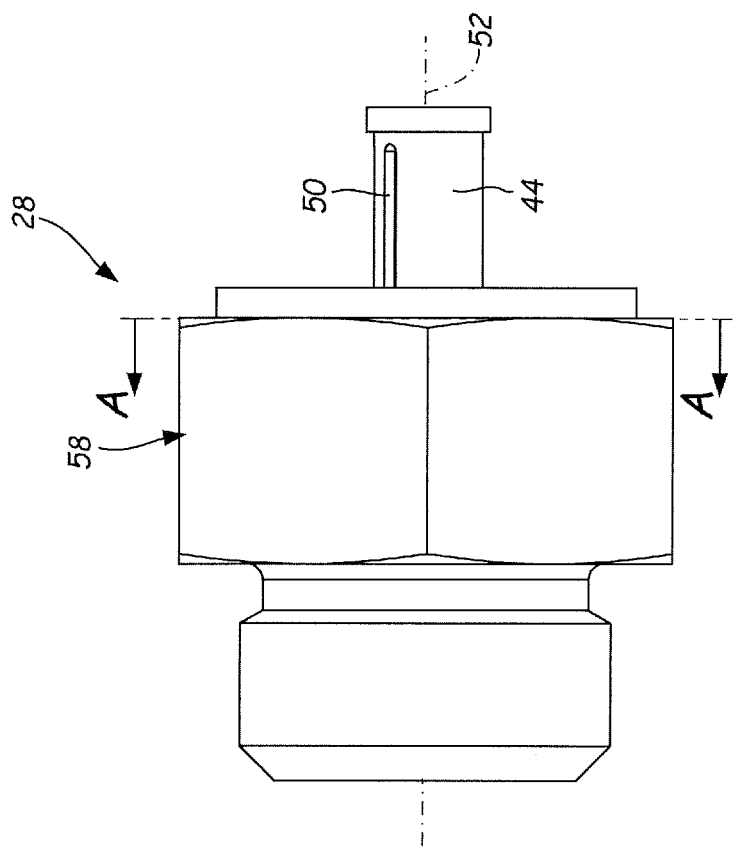

PRESSURE INDICATOR THAT RETAINS A HIGH PRESSURE INDICATION

CROSS REFERENCE TO RELATED APPLICATION

This application claims the benefit of priority from U.S. provisional patent application No. 62/568,501, filed on Oct. 5, 2017, the content of which is fully incorporated by reference herein.

BACKGROUND

Pressure vessels are commonly used for containing a variety of fluids under pressure, such as hydrogen, oxygen, natural gas, nitrogen, propane, methane and other fuels, for example. Generally, pressure vessels can be of any size or configuration. The vessels can be heavy or light, single-use (e.g., disposable), reusable, subjected to high pressures (greater than 50 psi, for example), low pressures (less than 50 psi, for example), or used for storing fluids at elevated or cryogenic temperatures, for example.

Suitable pressure vessel shell materials include metals, such as steel; or composites, which may include laminated layers of wound fiberglass filaments or other synthetic filaments bonded together by a thermal-setting or thermoplastic resin. The fiber may be fiberglass, aramid, carbon, graphite, or any other generally known fibrous reinforcing material. The resin material may be epoxy, polyester, vinyl ester, thermoplastic, or any other suitable resinous material capable of providing fiber-to-fiber bonding, fiber layer-to-layer bonding, and the fragmentation resistance required for the particular application in which the vessel is to be used. The composite construction of the vessels provides numerous advantages such as lightness in weight and resistance to corrosion, fatigue and catastrophic failure. These attributes are due to the high specific strengths of the reinforcing fibers or filaments.

A polymeric or other non-metallic resilient liner or bladder is often disposed within a composite shell to seal the vessel and prevent internal fluids from contacting the composite material. The liner can be manufactured by compression molding, blow molding, injection molding, or any other generally known technique. Alternatively, the liner can be made of other materials, including steel, aluminum, nickel, titanium, platinum, gold, silver, stainless steel, and any alloys thereof. Such materials can be generally characterized as having a high modulus of elasticity. In one embodiment, a liner is formed of blow molded high density polyethylene (HDPE).

FIG. 1 illustrates an elongated pressure vessel 10, such as that disclosed in U.S. Pat. No. 5,476,189, entitled "Pressure vessel with damage mitigating system," which is hereby incorporated by reference. Pressure vessel 10 has a main body section 12 and substantially hemispherical or dome-shaped end sections 14. A boss 16, typically constructed of aluminum, is provided at one or both ends of the pressure vessel 10 to provide a port for communication between the interior environment 17 of the pressure vessel 10 and the exterior environment 19. As shown in FIG. 2, pressure vessel 10 is formed with liner 20 (such as an inner polymer liner) covered by a shell 18. In an example, the shell 18 can be a filament-wound composite shell. The shell 18 resolves structural loads on the pressure vessel 10, while liner 20 provides a gas barrier.

FIG. 2 illustrates a partial cross-sectional view, taken along line 2-2 of FIG. 1, of an end section 14 including boss 16, such as that disclosed in U.S. Pat. No. 5,429,845, entitled "Boss for a filament wound pressure vessel," which is hereby incorporated by reference. Boss 16 includes neck 22 having exterior surface 23 and a port 26. The port 26 perpendicularly traverses the exterior surface 23 of the boss 16 and allows fluid communication between the exterior environment 19 and the interior environment 17 of pressure vessel 10. The boss 16 also includes a flange 24 (depicted as an annular flange) extending radially outward from port 26 of neck 22. Generally, flange 24 of boss 16 is contained between portions of liner 20 and/or is sandwiched between the liner 20 and the shell 18. Typically, shell 18 abuts neck 22.

In this disclosure, surfaces, directions, and elements facing interior environment 17 are referred to with the descriptor "interior," and surfaces, directions, and elements facing exterior environment 19 are referred to with the descriptor "exterior." It is to be understood that this notation is not limiting; rather, it is provided for convenience and ease of comprehension, and other descriptors may also be used and/or suitable. Details relevant to the formation of an exemplary pressure vessel are disclosed in U.S. Pat. No. 4,838,971, entitled "Filament Winding Process and Apparatus," which is incorporated herein by reference.

SUMMARY

In one aspect, a pressure indicator includes a body, a piston, first and second biasing elements, and a rotatable disc. The body includes a substantially cylindrical bore having a longitudinal axis and a shoulder. The piston is disposed at least partially in the bore. The piston includes a base and a stem that extends from the base along the longitudinal axis. The piston is located at a first axial position relative to the body when pressure of fluid acting on the base is below a threshold pressure. The first biasing element is disposed between the base of the piston and the shoulder of the body, wherein a force of the first biasing element is overcome by pressure of fluid acting on the base at or above the threshold pressure, thereby allowing the piston to move to a second axial position relative to the body. The rotatable disc is configured to rotate about the longitudinal axis. The disc has a first rotational position when the piston is in the first axial position. The second biasing element is configured to urge the disc to a second rotational position when the piston is in the second axial position.

In another aspect, a method for indicating that a pressure level of fluid in an interior of a pressure vessel has exceeded a threshold pressure level includes presenting a first visual indication when the pressure level of fluid in the interior of the pressure vessel is below the threshold pressure level; presenting a second visual indication, different from the first visual indication, when the pressure level of fluid in the interior of the pressure vessel has increased to a level above the threshold pressure level; and retaining the second visual indication even after the pressure level of fluid in the interior of the pressure vessel has decreased to a level below the threshold pressure level.

This disclosure, in its various combinations, either in apparatus or method form, may also be characterized by the following listing of items:
1. A pressure indicator including:
    a body including:
        a substantially cylindrical bore having a longitudinal axis; and
        a shoulder;

a piston disposed at least partially in the bore, the piston including:
  a base; and
  a stem that extends from the base along the longitudinal axis;
  wherein the piston is located at a first axial position relative to the body when pressure of fluid acting on the base is below a threshold pressure;
a first biasing element disposed between the base of the piston and the shoulder of the body, wherein a force of the first biasing element is overcome by pressure of fluid acting on the base at or above the threshold pressure, thereby allowing the piston to move to a second axial position relative to the body;
a rotatable disc configured to rotate about the longitudinal axis, wherein the disc has a first rotational position when the piston is in the first axial position; and
a second biasing element configured to urge the disc to a second rotational position when the piston is in the second axial position.

2. The pressure indicator of item 1, wherein the rotatable disc includes:
  a first sector having a first visual indication; and
  a second sector having a second visual indication different from the first visual indication.

3. The pressure indicator of item 2, further including a plate having a window through which the first sector is visible when the disc is in the first rotational position, and through which the second sector is visible when the disc is in the second rotational position.

4. The pressure indicator of item 3, wherein the plate is stationary relative to the body.

5. The pressure indicator of any of items 1-4, wherein the rotatable disc includes a tab.

6. The pressure indicator of item 5, wherein the stem includes a first groove configured to receive the tab when the piston is in the first axial position.

7. The pressure indicator of item 6, wherein the first groove is aligned substantially parallel to the longitudinal axis.

8. The pressure indicator of any of items 6-7, wherein the stem includes a second groove that is:
  aligned substantially orthogonal to the longitudinal axis;
  connected to the first groove; and
  configured to receive the tab when the piston is in the second axial position.

9. The pressure indicator of item 8, wherein the stem includes a third groove that is:
  aligned substantially parallel to the longitudinal axis;
  connected to the second groove; and
  configured to receive the tab when the piston moves from the second axial position to the first axial position.

10. The pressure indicator of any of items 1-9, wherein:
  the rotatable disc includes a projection; and
  the body includes an arcuate recess configured to accept the projection.

11. The pressure indicator of item 10, wherein:
  the arcuate recess has opposite first and second ends;
  the projection is located at the first end when the rotational disc is in the first rotational position; and
  the projection is located at the second end when the rotational disc is in the second rotational position.

12. The pressure indicator of any of items 1-11, wherein the body includes a recess in which the second biasing element is located.

13. The pressure indicator of any of items 1-12, wherein the second biasing element includes opposite first and second ends, wherein the first end is fixed relative to the body, and wherein the second end is attached to the rotatable disc.

14. A method for indicating that a pressure level of fluid in an interior of a pressure vessel has exceeded a threshold pressure level, the method including:
  presenting a first visual indication when the pressure level of fluid in the interior of the pressure vessel is below the threshold pressure level;
  presenting a second visual indication, different from the first visual indication, when the pressure level of fluid in the interior of the pressure vessel has increased to a level above the threshold pressure level; and
  retaining the second visual indication even after the pressure level of fluid in the interior of the pressure vessel has decreased to a level below the threshold pressure level.

15. The method of item 14 wherein presenting the first visual indication includes positioning a first sector of a rotatable disc in a window of a plate.

16. The method of item 15 wherein presenting the second visual indication includes rotating the rotatable disc to position a second sector of the rotatable disc in the window of the plate.

17. The method of item 16 wherein retaining the second visual indication includes maintaining a relative position of the rotatable disc with respect to the plate.

18. The method of any of items 14-17 wherein presenting the first visual indication includes positioning a central stem of an indicator substantially within the body of the indicator.

19. The method of item 18 wherein presenting the second visual indication includes projecting at least a portion of the central stem of the indicator outside the body of the indicator.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

FIG. 6 is a side elevation view of the indicator of FIGS. 5 and 5A.

FIG. 6A is an end cross-sectional view of the indicator, taken along line A-A of FIG. 6.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

The current concept describes an indicator for visually showing if a pressure cylinder has experienced pressurization over a set threshold. Currently, it is difficult to determine if a particular cylinder has ever been over-pressurized in the field. Such a determination would aid in evaluating the integrity of the cylinder and providing additional data for failure investigation.

Figure 1:
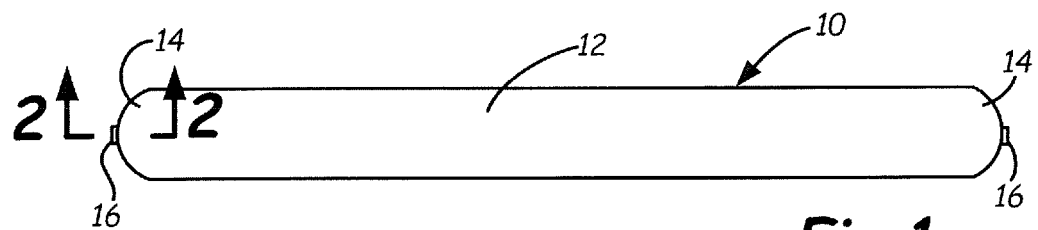
FIG. 1 is a side view of a typical conventional pressure vessel.
Figure 2:
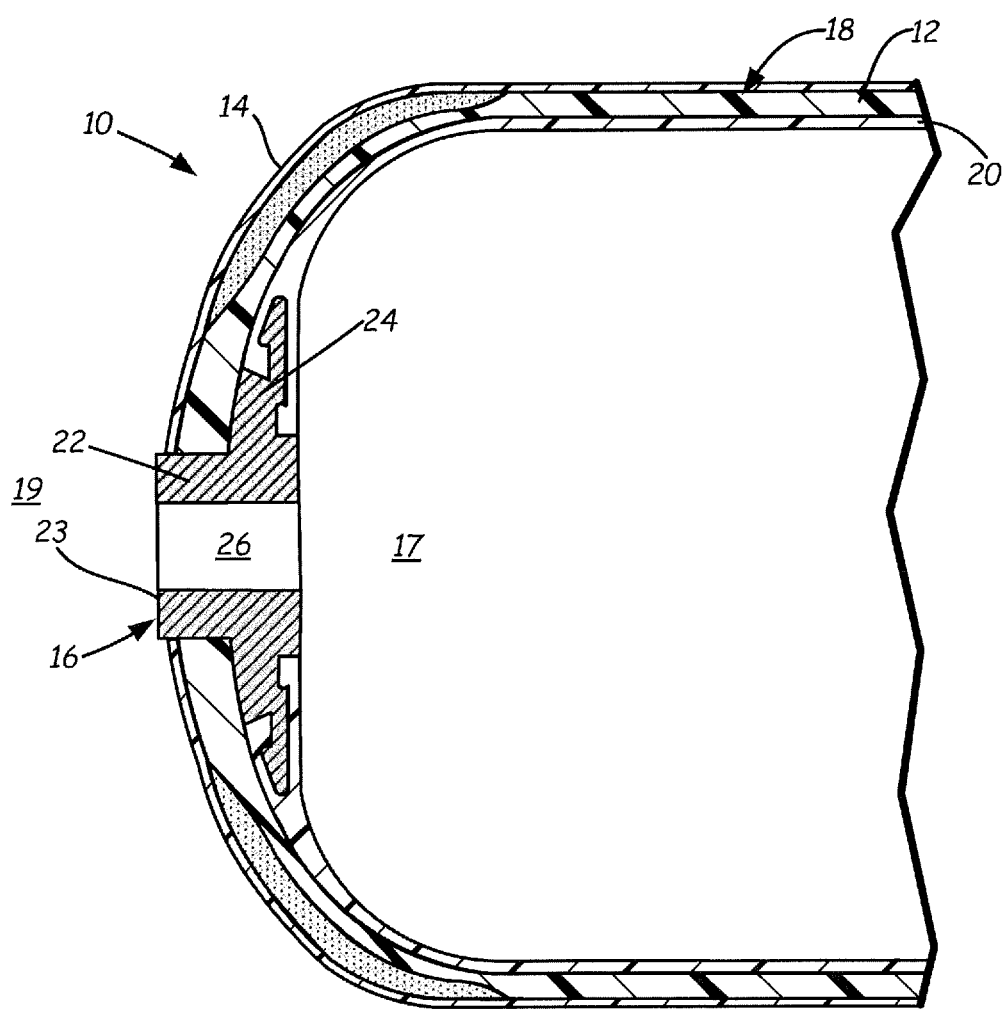
FIG. 2 is a partial cross-sectional view of one end of the pressure vessel of FIG. 1, taken along line 2-2 of FIG. 1.
Figure 3:
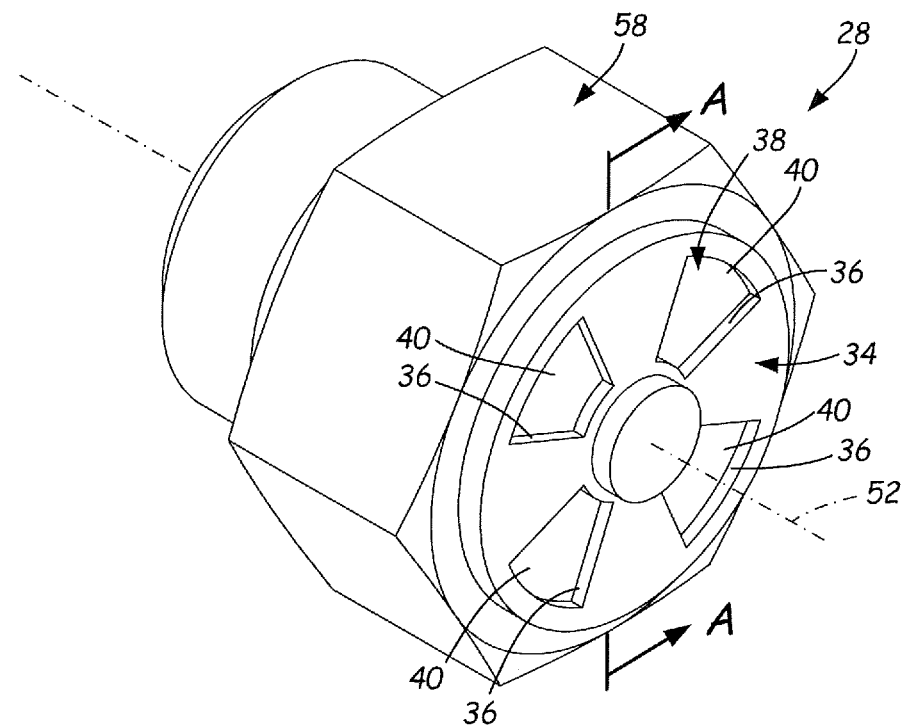
FIG. 3 is a perspective view of an exemplary pressure indicator in a low-pressure configuration.
Figure 3A:
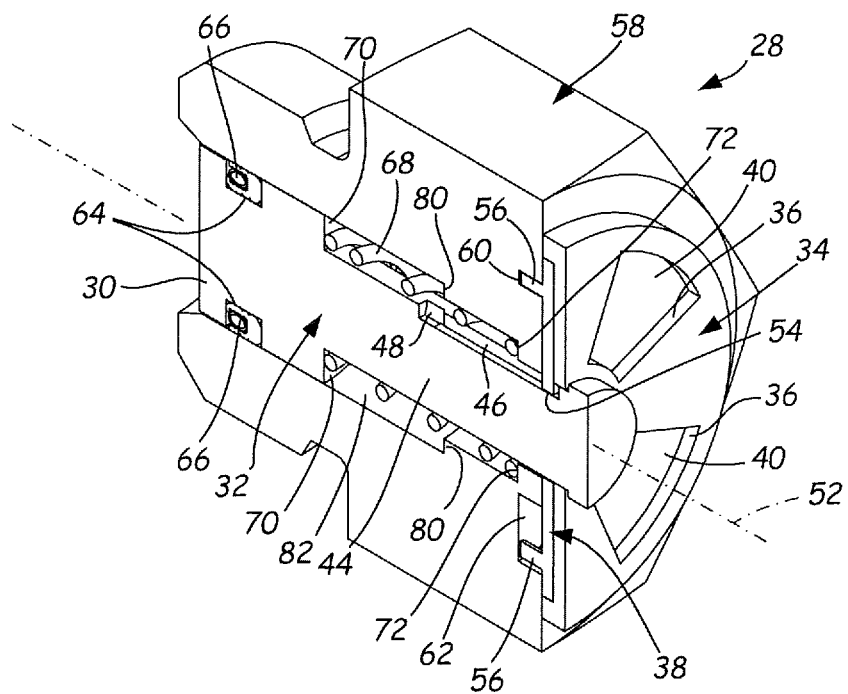
FIG. 3A is a cross-sectional view of the indicator of FIG. 3, taken along line A-A of FIG. 3.

An exemplary indicator is formed as a threaded fitting plumbed into the pressure vessel at a boss or valve. As shown in FIGS. 3 and 3A, the indicator has a blank presentation when there is no internal pressure in the pressure vessel, or when there is internal pressure under a threshold pressure at which the spring between the piston and the indicator body is compressed. At FIGS. 5 and 5A, the internal pressure is over the threshold pressure, thereby moving the piston toward the right of the drawing and thereby compressing the spring. At the surface of the pressure indicator, a stationary plate with openings therein covers some of the sectors of the plate underneath, which are alternately blank and designated with a symbol (shown in FIG. 8).

Figure 4A:
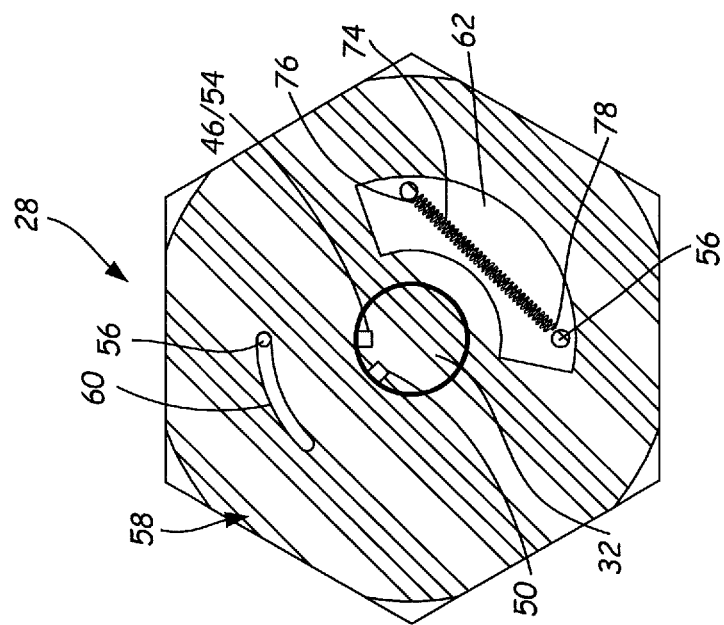
FIG. 4A is an end cross-sectional view, taken along line A-A of FIG. 4.
Figure 4:
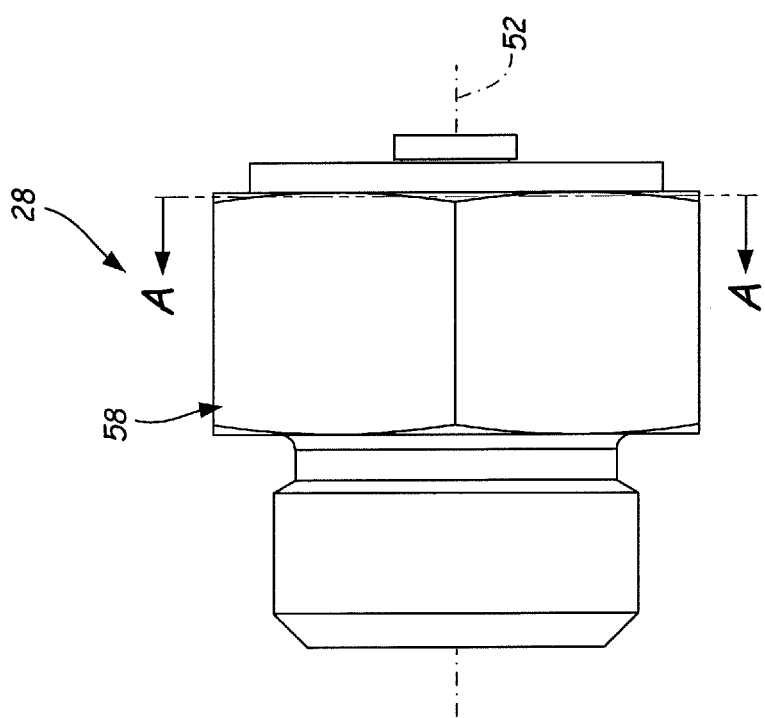
FIG. 4 is a side elevation view of the indicator of FIGS. 3 and 3A.
Figure 5:
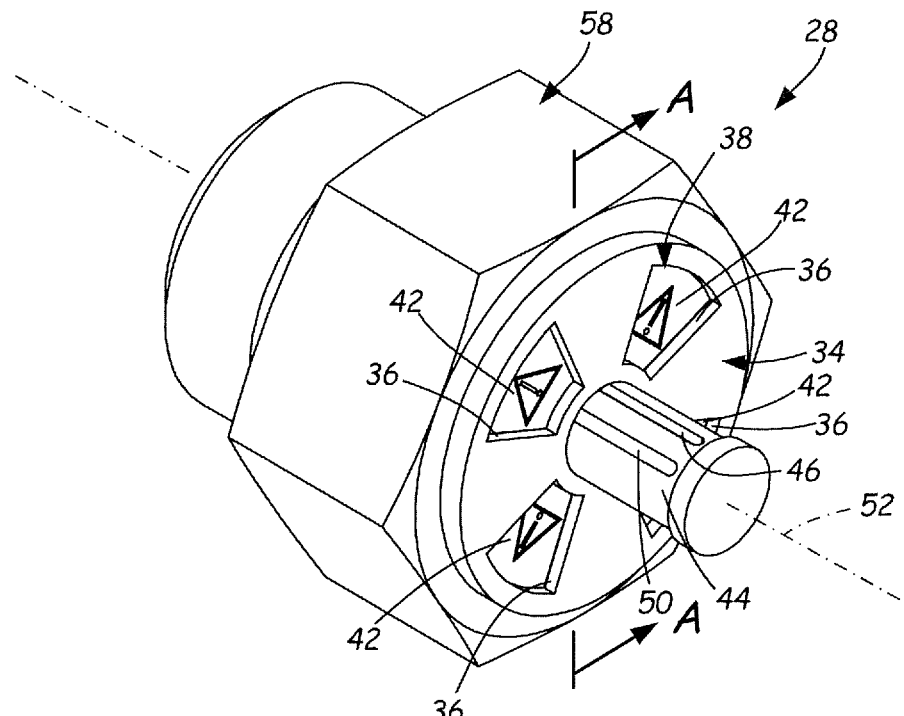
FIG. 5 is a perspective view of the exemplary indicator in a high-pressure configuration.

As shown in FIGS. 3-4A, when the piston is retracted into the indicator, a tab of the indicator disc resides in a first groove, so that the blank sectors show in the windows of the stationary plate. However, as shown in FIGS. 5-6A, once compressed by internal pressure over the threshold pressure level, the tab of the indicator disc rotates within the second groove of the piston, by 45 degrees, which then allows the alternately symboled sectors to show in the plate windows. Moreover, the piston's stem "pops out" past the windowed plate. While a particular embodiment of the disclosed pressure indicator is illustrated, it is to be understood that the teachings herein can also be applied to other embodiments, such as where the disc rotates by a different radial angle than 45 degrees, or where the windowed plate has more or fewer windows, for example.

Figure 7:
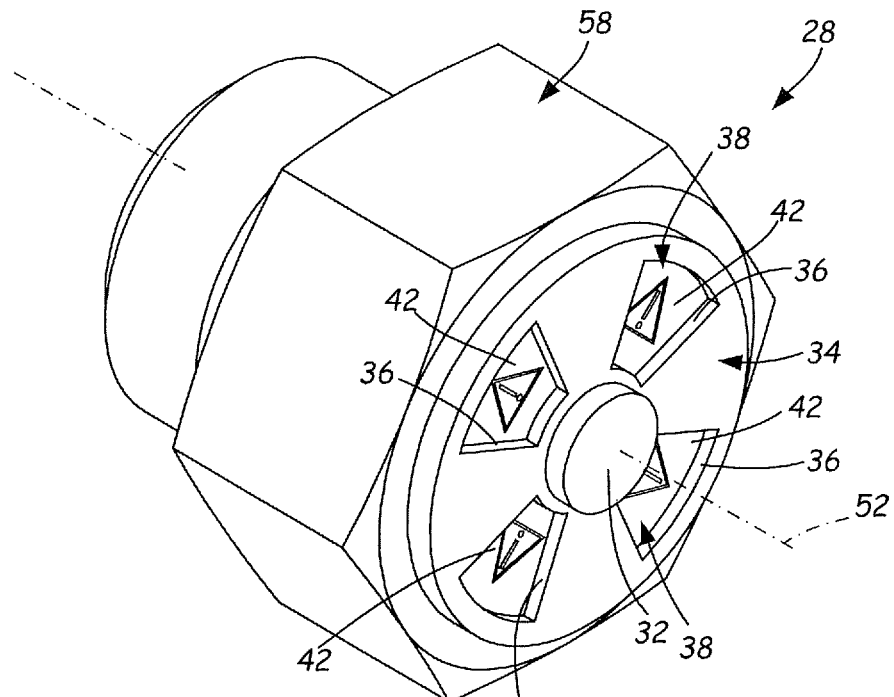
FIG. 7 is a perspective view of an indicator that has been tripped due to a high-pressure state, and remains tripped even when the pressure vessel returns to a low pressure state.

Even when internal pressure of the vessel returns to a below-threshold level, the indicator remains tripped (i.e., showing high pressure sectors 42 in windows 36), as shown in FIG. 7, so that a user can tell upon visual inspection that the pressure vessel has experienced a pressure over its maximum allowed level (i.e., the threshold pressure level).

Figure 8:
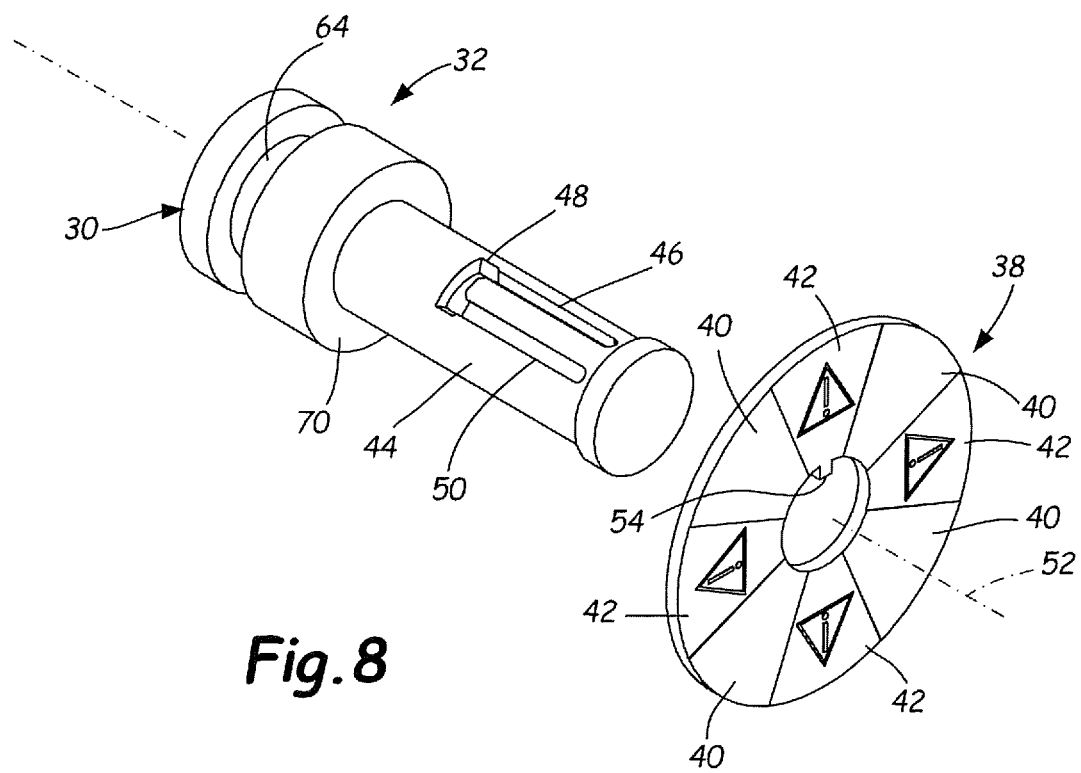
FIG. 8 is an exploded perspective view of a piston and rotatable indicator disk of an exemplary pressure indicator.

FIGS. 3-4A show an exemplary pressure indicator 28 in a low-pressure configuration. In an exemplary method of use, pressure indicator 28 is installed on a pressure vessel 10 at an opening, such as port 26, for example, or another opening through pressure vessel 10 so that base 30 of piston 32 is exposed to, or is in fluid communication with, an interior environment 17 of pressure vessel 10. Indicator plate 34 having windows 36 therein is viewable by a user positioned at an environment 19 exterior to pressure vessel 10. As shown in FIGS. 3, 3A and 8, rotatable disk 38 has alternating sectors 40 having a low-pressure visual indication and alternating sectors 42 having a high-pressure visual indication.

As shown in FIGS. 3 and 3A, the low-pressure sectors 40 are visible through windows 36 of indicator plate 34, while the high-pressure indicator sectors 42 are covered by opaque portions of indicator plate 34 positioned between windows 36. As shown in FIGS. 3A and 8, piston 32 includes base 30 and stem 44. In an exemplary embodiment, stem 44 includes first groove 46, second groove 48, and third groove 50. In an exemplary embodiment, first and third grooves 46, 50 are substantially parallel and aligned with longitudinal axis 52 of indicator 28. Second groove 48 is located at an end of each of first and third grooves 46, 50 and is oriented substantially orthogonally to the first and third grooves 46, 50. Rotatable disk 38 includes tab 54, configured to travel within each of grooves 46, 48 and 50. As shown in FIGS. 3A and 4A, a back side of rotatable disk 38 includes two diametrically opposed projections 56 configured for insertion into body 58 of indicator 28 at recesses 60 and 62.

As shown in FIGS. 3A and 8, base 30 of piston 32 includes groove 64 for the acceptance of a seal 66, such as an O-ring or gasket. As shown in FIG. 3A, biasing element 68, such as a helical compression spring, for example, is positioned in a cavity between piston 32 and body 58 (at bore 82), with its ends compressed by shoulder 70 of base 30 of piston 32 and shoulder 72 of body 58.

FIG. 4A shows another biasing element 74, in the form of a helical tension spring, which is shown in a stretched configuration, with its end 76 attached at a fixed location to body 58 within recess 62. The other end 78 of biasing element 74 is attached to projection 56 of rotatable disk 38, with projection 56 being movable along a circular arc portion within recess 62. As shown in FIGS. 3A and 4A, in a low-pressure configuration of pressure indicator 28, sectors 40 indicating low pressure are visible through windows 36 of indicator plate 34. Moreover, tab 54 of rotatable disk 38 is located in first groove 46 of stem 44 of piston 32.

Figure 5A:
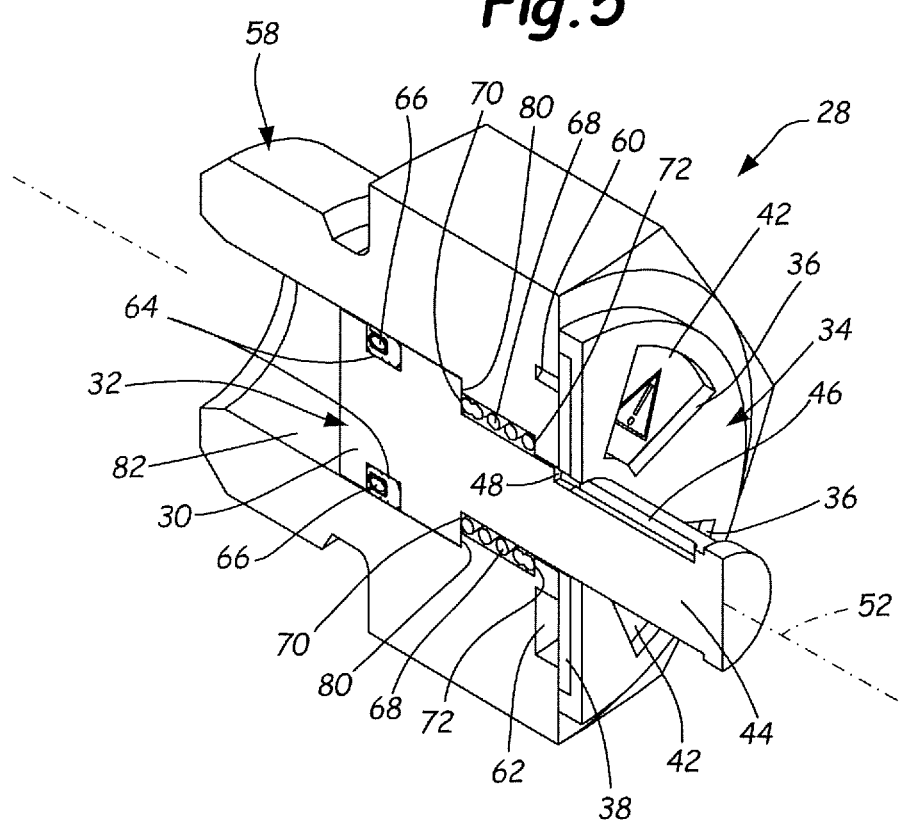
FIG. 5A is a cross sectional view of the indicator of FIG. 5, taken along line A-A of FIG. 5.

Pressure indicator 28 remains in the low-pressure configuration of FIGS. 3-4A as long as internal pressure in interior environment 17 of pressure vessel 10 is below a threshold value calibrated to a spring constant of biasing element 68. When that pressure threshold value is met or exceeded, fluid pressure acts upon base 30 of piston 32 to move piston 32 to the right in the illustrated drawings, so that biasing element 68 is compressed, as shown in FIG. 5A. This displacement of piston 32 in a direction to the right of the drawings is limited by contact of shoulder 70 of base 30 of piston 32 with shoulder 80 of body 58. With a compression of biasing element 68 to this extent, tab 54 of rotatable disk 38 falls into orthogonal groove 48 of stem 44 of piston 32.

In an exemplary embodiment, when tab 54 of rotatable disk 38 enters orthogonal groove 48, pulling forces from biasing element 74 (by the return of biasing element 74 to its non-stretched state) urge disc 38 to rotate about longitudinal axis 52 relative to body 58, so that tab 54 moves along groove 48 toward groove 50. With tab 54 of rotatable disk 38 no longer held in first groove 46, rotatable disk 38 is allowed to rotate around longitudinal axis 52, thereby allowing alternating sectors 42 showing a high-pressure indication to be visible through windows 36 of indicator plate 34. Moreover, as fluid pressure inside pressure vessel 10 pushes piston 32 to the right in the drawing illustrations, portions of stem 44 pop out past a face of indicator plate 34. Accordingly, during a high-pressure state of pressure vessel 10 above a threshold pressure value, two visual indicators of this high-pressure state are presented to a viewer: 1) an extended state of stem 44 of piston 32 past indicator plate 34; and 2) the visible alternating sectors 42 with high pressure indicia thereon.

While particular embodiments of alternating sectors 40 showing low pressure and alternating sectors 42 showing high pressure are illustrated, it is contemplated that other visual distinguishing indicia can be used. For example, alternating sectors 40 showing low pressure can have a green color, while alternating sectors 42 having a high pressure indication can be colored red. Other contrasting visual indicia can be utilized. For example, an exposed portion of stem 44 of piston 32 may have a contrasting color scheme.

As shown in FIG. 7, pressure inside pressure vessel 10 has dropped below the threshold pressure value, thereby allowing biasing element 68 to expand, to move piston 32 back to the left direction shown in the drawing illustrations and into body 58. However, the visual indication of rotatable disk 38 remains the same, with alternating sectors 42 indicating high pressure visible through windows 36 of indicator plate 34. This retention of the visibility of high pressure sectors 42 results from the pull of biasing element 74, which retains projections 56 of the rotatable disk 38 in the positions shown in FIG. 6A. Accordingly, when piston 32 returns to the position toward the left of the drawings, tab 54 of rotatable disk 38 now rides in third groove 50. Thus, after a high-pressure situation that triggers the high-pressure indications of sectors 42 of rotatable disk 38, the visual indication of rotatable disk 38 remains tripped (i.e., showing high pressure sectors 42 through windows 36) even when the pressure vessel's interior environment 17 returns to a low-pressure state.

When an observer sees the configuration of pressure indicator 28 shown in FIG. 3, he or she knows that the pressure vessel has not experienced internal fluid pressure above a threshold calibrated for pressure indicator 28. When a user sees the indication of FIG. 5, the user is alerted that the pressure vessel is currently at a high-pressure state over the threshold pressure value. When the user sees the configuration of FIG. 7, the user is alerted that the pressure vessel has previously experienced a high-pressure state above the threshold pressure, but has currently returned to a low-pressure state below the pressure threshold value.

Accordingly, the disclosed pressure indicator 28 advantageously shows not only low-pressure and high-pressure states of an interior environment 17 of pressure vessel 10, but also that the pressure vessel 10 has previously experienced a high-pressure state over the threshold, though it may be currently under such a pressure value threshold. This indication that the pressure vessel has been over-pressurized provides a user with additional information regarding the integrity of the pressure vessel. In an exemplary method of use, the pressure indicator 28 is calibrated to mechanically actuate at a threshold pressure that is just over a maximum recommended fill pressure for that particular pressure vessel. Pressure indicator 28 is a reliable mechanical device that does not require complicated electrical, sensor or signal communication networks.

While particular structures for elements of the pressure indicator are illustrated and described, it is contemplated that other structures can be used to achieve similar functions. For example, while biasing elements 68 and 74 are described as springs, it is contemplated that other mechanical means of storing energy can be used, such as non-helical springs and belleville washers, for example. Such biasing elements can be calibrated to trip the pressure indicator at the desired threshold pressure value. For example, biasing elements 68 with less resistance will allow the pressure indicator 28 to trip (i.e., show the alternating sectors 42 indicating high pressure) at a lower threshold pressure value.

An exemplary, non-limiting embodiment of a pressure indicator 28 includes body 58, piston 32, first biasing element 68, rotatable disc 38, and second biasing element 74. Body 58 includes a substantially cylindrical bore 82 having a longitudinal axis 52 and a shoulder 80. Piston 32 is disposed at least partially in the bore 82, the piston 32 including a base 30 and a stem 44 that extends from the base 30 along the longitudinal axis 52. Piston 32 is located at a first axial position (shown in FIG. 3A) relative to the body 58 when pressure of fluid acting on the base 30 is below a threshold pressure. First biasing element 68 is disposed between the base 30 of the piston 32 and the shoulder 80 of the body 58. A force (such as a spring force) of the first biasing element 68 is overcome by pressure of fluid acting on the base 30 at or above the threshold pressure, thereby allowing the piston 32 to move to a second axial position relative to the body (shown in FIG. 5A). A rotatable disc 38 is configured to rotate about the longitudinal axis 52, wherein the disc 38 has a first rotational position (shown in FIG. 3A) when the piston 32 is in the first axial position. A second biasing element 74 is configured to urge the disc 38 to a second rotational position (shown in FIG. 5A) when the piston 32 is in the second axial position.

In an exemplary embodiment, rotatable disc 38 includes a first sector 40 having a first visual indication and a second sector 42 having a second visual indication different from the first visual indication. In an exemplary embodiment, pressure indicator 28 further includes a plate 34 having a window 36 through which the first sector 40 is visible when the disc 38 is in the first rotational position, and through which the second sector 42 is visible when the disc 38 is in the second rotational position. In an exemplary embodiment, plate 34 is stationary relative to the body 58. In another embodiment, indicator 28 could be designed so that plate 34 rotates while disc 38 remains stationary, with the relative movement of plate 34 and disc 38 to allow either first sectors 40 or second sectors 42 to be visible through windows 36.

In an exemplary embodiment, rotatable disc 38 includes a tab 54. Stem 44 includes a first groove 46 configured to receive the tab 54 when the piston 32 is in the first axial position. In an exemplary embodiment, first groove 46 is aligned substantially parallel to the longitudinal axis 52. In an exemplary embodiment, stem 44 includes a second groove 48 that is aligned substantially orthogonal to the longitudinal axis 52, is connected to the first groove 46, and is configured to receive the tab 54 when the piston 32 is in the second axial position. In an exemplary embodiment, stem 44 includes a third groove 50 that is aligned substantially parallel to the longitudinal axis 52, is connected to the second groove 48, and is configured to receive the tab 54 when the piston 32 moves from the second axial position (see FIG. 5A) to the first axial position (see FIG. 7).

In an exemplary embodiment, rotatable disc 38 includes a projection 56, and body 58 includes an arcuate recess 60 configured to accept the projection 56. In an exemplary embodiment, arcuate recess 60 has opposite first and second ends. As shown in FIG. 4A, projection 56 is located at the first end when the rotational disc 38 is in the first rotational position. As shown in FIG. 6A, projection 56 is located at the second end when the rotational disc 38 is in the second rotational position.

In an exemplary embodiment, body 58 includes a recess 62 in which the second biasing element 74 is located. In an exemplary embodiment, second biasing element 74 includes opposite first and second ends, wherein the first end 76 is fixed relative to the body 58, and wherein the second end 78 is attached to the rotatable disc 38.

In an exemplary embodiment, a method is disclosed for indicating that a pressure level of fluid in an interior 17 of a pressure vessel 10 has exceeded a threshold pressure level. The method includes presenting a first visual indication (see FIG. 3) when the pressure level of fluid in the interior 17 of the pressure vessel 10 is below the threshold pressure level. The method includes presenting a second visual indication (see FIG. 5), different from the first visual indication (see FIG. 3), when the pressure level of fluid in the interior 17 of the pressure vessel 10 has increased to a level above the threshold pressure level. The method includes retaining the second visual indication (see FIG. 7) even after the pressure level of fluid in the interior 17 of the pressure vessel 10 has decreased to a level below the threshold pressure level.

In an exemplary embodiment, presenting the first visual indication includes positioning a first sector 40 of a rotatable disc 38 in a window 36 of a plate 34. In an exemplary embodiment, presenting the second visual indication includes rotating the rotatable disc 38 to position a second sector 42 of the rotatable disc 38 in the window 36 of the plate 34. In an exemplary embodiment, retaining the second visual indication includes maintaining a relative position of the rotatable disc 38 with respect to the plate 34.

In an exemplary embodiment, presenting the first visual indication includes positioning a central stem 44 of an indicator 28 substantially within the body 58 of the indicator 28. In an exemplary embodiment, presenting the second visual indication includes projecting at least a portion of the central stem 44 of the indicator 28 outside the body 58 of the indicator 28.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

The invention claimed is:

1. A pressure indicator including:
   a body including:
      a cylindrical bore having a longitudinal axis; and
      a shoulder;
   a rotatable disc configured to rotate about the longitudinal axis, wherein the rotatable disc includes a tab;
   a piston disposed at least partially in the bore, the piston including:
      a base; and
      a stem that extends from the base along the longitudinal axis, wherein the stem includes a first groove configured to receive the tab when the piston is in a first axial position;
      wherein the piston is located at the first axial position relative to the body when pressure of fluid acting on the base is below a threshold pressure, and wherein the disc is in a first rotational position;
   a first biasing element disposed between the base of the piston and the shoulder of the body, wherein a force of the first biasing element is overcome by pressure of fluid acting on the base at or above the threshold pressure, thereby allowing the piston to move to a second axial position relative to the body;
   a second biasing element configured to urge the disc to a second rotational position when the piston is in the second axial position.

2. The pressure indicator of claim 1, wherein the rotatable disc includes:
   a first sector having a first visual indication; and
   a second sector having a second visual indication different from the first visual indication.

3. The pressure indicator of claim 2, further including a plate having a window through which the first sector is visible when the disc is in the first rotational position, and through which the second sector is visible when the disc is in the second rotational position.

4. The pressure indicator of claim 3, wherein the plate is stationary relative to the body.

5. The pressure indicator of claim 1, wherein the first groove is aligned parallel to the longitudinal axis.

6. The pressure indicator of claim 1, wherein the stem includes a second groove that is:
   aligned orthogonal to the longitudinal axis;
   connected to the first groove; and
   configured to receive the tab when the piston is in the second axial position.

7. The pressure indicator of claim 6, wherein the stem includes a third groove that is:
   aligned parallel to the longitudinal axis;
   connected to the second groove; and
   configured to receive the tab when the piston moves from the second axial position to the first axial position.

8. A pressure indicator including:
   a body including:
      a cylindrical bore having a longitudinal axis; and
      a shoulder;
   a piston disposed at least partially in the bore, the piston including:
      a base; and
      a stem that extends from the base along the longitudinal axis;
      wherein the piston is located at a first axial position relative to the body when pressure of fluid acting on the base is below a threshold pressure;
   a first biasing element disposed between the base of the piston and the shoulder of the body, wherein a force of the first biasing element is overcome by pressure of fluid acting on the base at or above the threshold pressure, thereby allowing the piston to move to a second axial position relative to the body;
   a rotatable disc configured to rotate about the longitudinal axis, wherein the disc has a first rotational position when the piston is in the first axial position, wherein the rotatable disc includes a projection and the body includes an arcuate recess configured to accept the projection, wherein:
the arcuate recess has opposite first and second ends;
the projection is located at the first end when the rotational disc is in the first rotational position; and
the projection is located at the second end when the rotational disc is in a second rotational position; and
a second biasing element configured to urge the disc to the second rotational position when the piston is in the second axial position.

9. The pressure indicator of claim 1, wherein the body includes a recess in which the second biasing element is located.

10. The pressure indicator of claim 1, wherein the second biasing element includes opposite first and second ends, wherein the first end is fixed relative to the body, and wherein the second end is attached to the rotatable disc.

11. A method for indicating that a pressure level of fluid in an interior of a pressure vessel has exceeded a threshold pressure level, the method including:
presenting a first visual indication when the pressure level of fluid in the interior of the pressure vessel is below the threshold pressure level;
presenting a second visual indication, different from the first visual indication, when the pressure level of fluid in the interior of the pressure vessel has increased to a level above the threshold pressure level; and
retaining the second visual indication even after the pressure level of fluid in the interior of the pressure vessel has decreased to a level below the threshold pressure level.

12. The method of claim 11 wherein presenting the first visual indication includes positioning a first sector of a rotatable disc in a window of a plate.

13. The method of claim 12 wherein presenting the second visual indication includes rotating the rotatable disc to position a second sector of the rotatable disc in the window of the plate.

14. The method of claim 13 wherein retaining the second visual indication includes maintaining a relative position of the rotatable disc with respect to the plate.

15. The method of claim 11 wherein presenting the first visual indication includes positioning a central stem of an indicator within the body of the indicator.

16. The method of claim 15 wherein presenting the second visual indication includes projecting at least a portion of the central stem of the indicator outside the body of the indicator.

17. The pressure indicator of claim 8, wherein the rotatable disc includes:
a first sector having a first visual indication; and
a second sector having a second visual indication different from the first visual indication.

18. The pressure indicator of claim 17, further including a plate having a window through which the first sector is visible when the disc is in the first rotational position, and through which the second sector is visible when the disc is in the second rotational position.

19. The pressure indicator of claim 18, wherein the plate is stationary relative to the body.

20. The pressure indicator of claim 8, wherein the rotatable disc includes a tab.

* * * * *